April 5, 1949. A. SADLON 2,466,558

MULTIPURPOSE ELECTRICAL TESTING METER

Filed Feb. 25, 1946 4 Sheets-Sheet 1

INVENTOR.
Adam Sadlon,
BY George D. Richards
Attorney

April 5, 1949. A. SADLON 2,466,558
MULTIPURPOSE ELECTRICAL TESTING METER
Filed Feb. 25, 1946 4 Sheets-Sheet 4

INVENTOR.
Adam Sadlon,
BY George D. Richards,
Attorney

Patented Apr. 5, 1949

2,466,558

UNITED STATES PATENT OFFICE 2,466,558

MULTIPURPOSE ELECTRICAL TESTING METER

Adam Sadlon, Newark, N. J.

Application February 25, 1946, Serial No. 650,072

5 Claims. (Cl. 171—95)

This invention relates to improvements in apparatus for testing electrical circuits; and the invention has reference, more particularly, to a multi-purpose testing instrument or meter capable of selective use for determining various characteristics of an electric circuit.

Multi-purpose testing meters as heretofore provided are of very complicated character, and require complicated pre-setting manipulating adjustment before use thereof in testing an electric circuit for a selected characteristic can be made; in fact, the pre-setting manipulations necessary to be manually performed, preparatory to use for a given selected purpose, are very exacting, and easily subject to occurrence of error, so that great mental alertness is required of the user in order to forestall possibility of erroneous operation of the meter.

Having the above in view, it is the principal object of this invention to provide a simple and yet highly efficient multi-purpose testing instrument or meter, capable of selective use for determining or measuring various characteristics of an electric circuit, wherein the pre-setting functions, necessary to condition the instrument or meter for a given selected purpose, are substantially automatically carried out, and the desired pre-set condition visibly indicated, all by the mere turning of a single actuating finger piece or knob with which the instrument is provided, whereby to cause the travel of an endless conveyer by which proper meter scales are operatively related to a D'Arsonval movement, and whereby testing circuit resistors and other agencies and testing circuit conditioning switches are simultaneously automatically selected and connected in operative relation to said D'Arsonval movement, without necessity for the exercise of special mental concentration upon the part of the user beyond that attention necessary to observe the visibly displayed identifying indicia by which given desired pre-set conditions are indicated.

Other objects of this invention, not at this time more particularly enumerated, will be understood from the following detailed description of the same.

Figure 1:
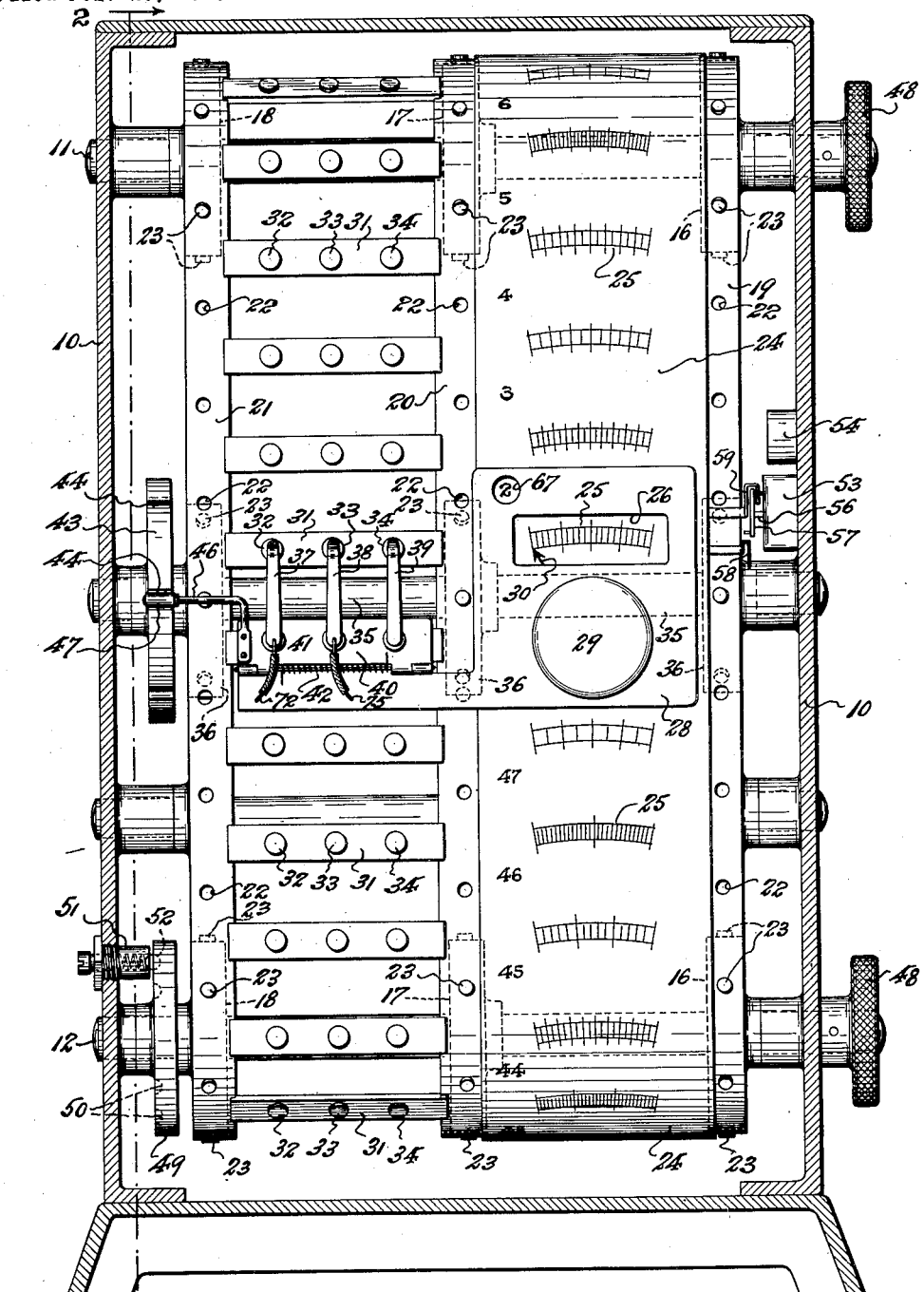
Figure 2:
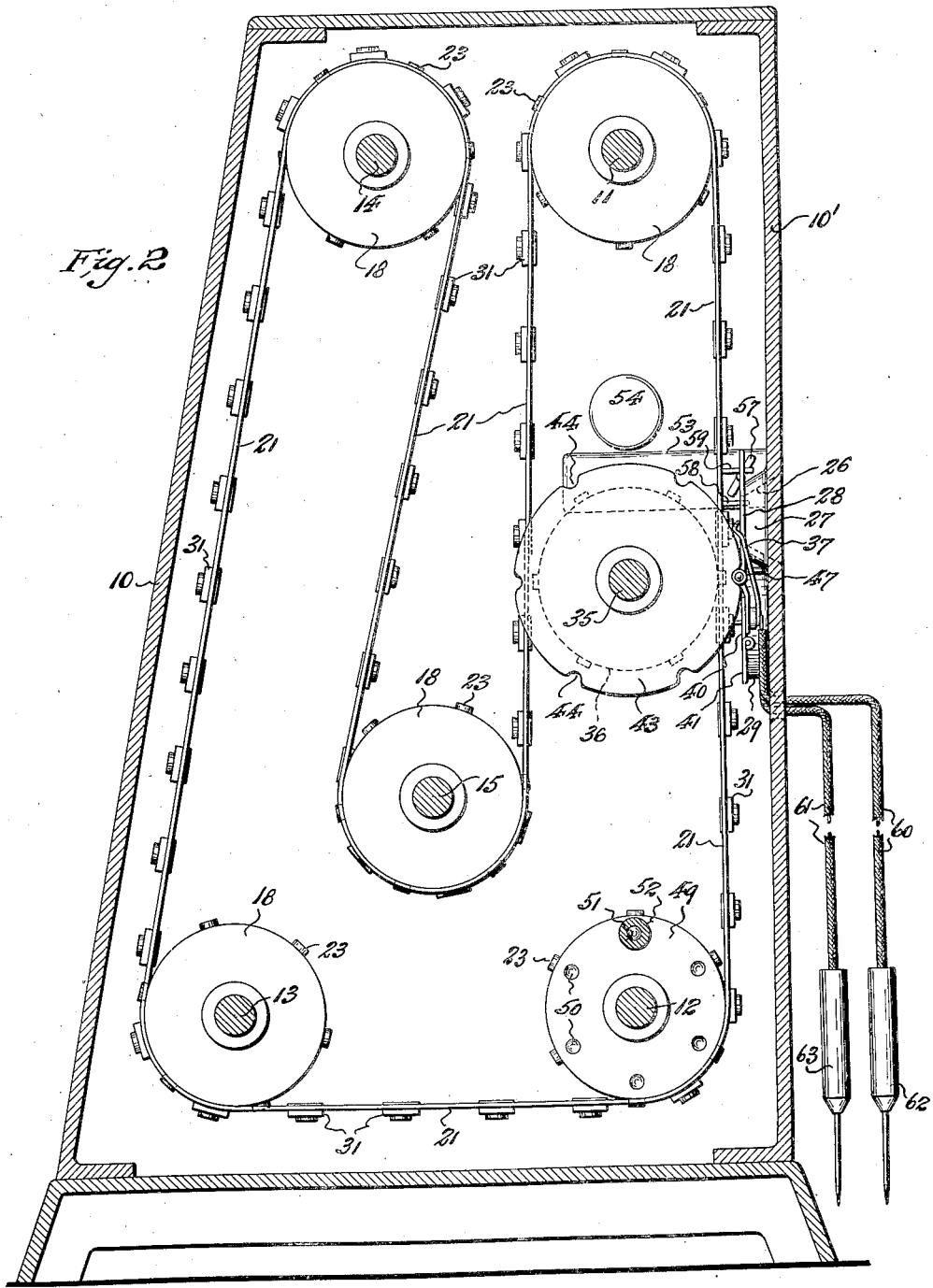

Illustrative embodiments of this invention are shown in the accompanying drawings, in which:

Fig. 1 is an elevational view of the instrument according to this invention with the casing or housing thereof in section to disclose the interior structure thereof; and Fig. 2 is a transverse vertical sectional view thereof, taking on line 2—2 in Fig. 1.

Figure 3:
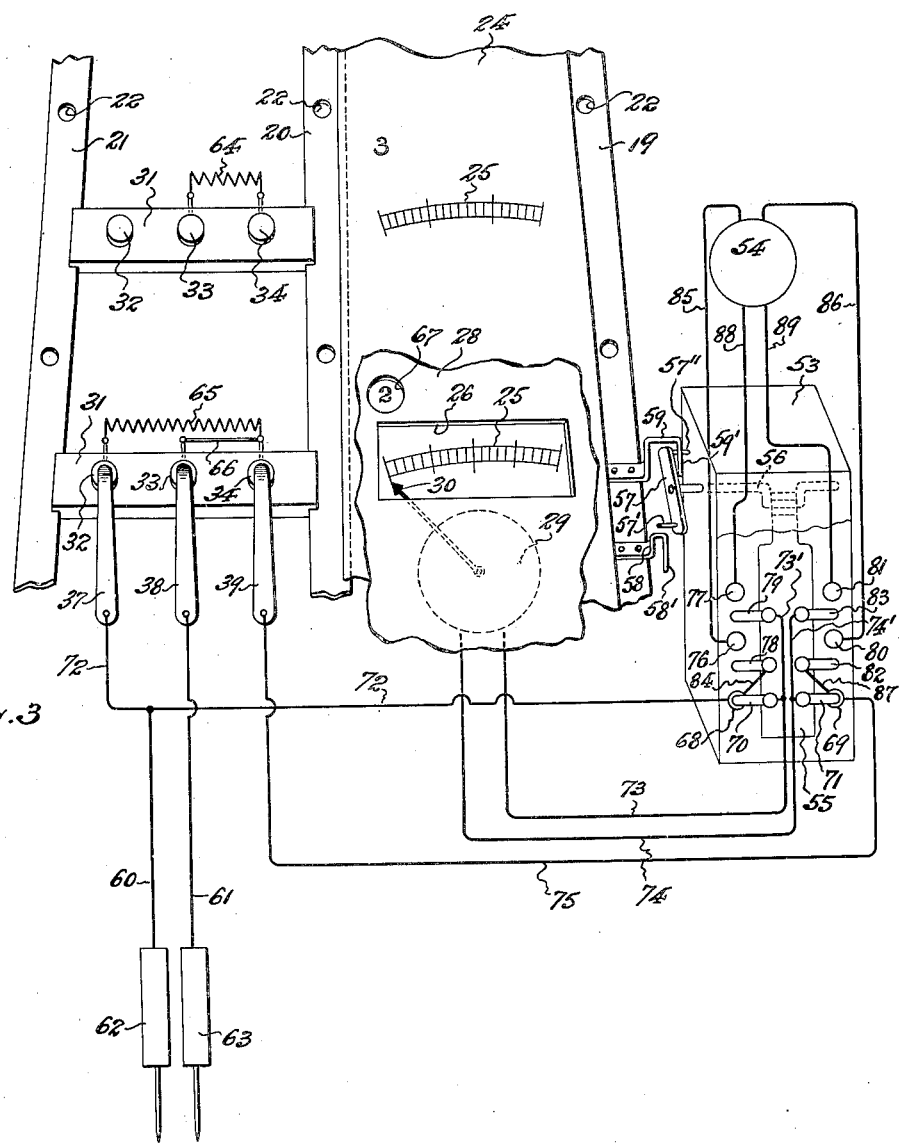
Figure 4:
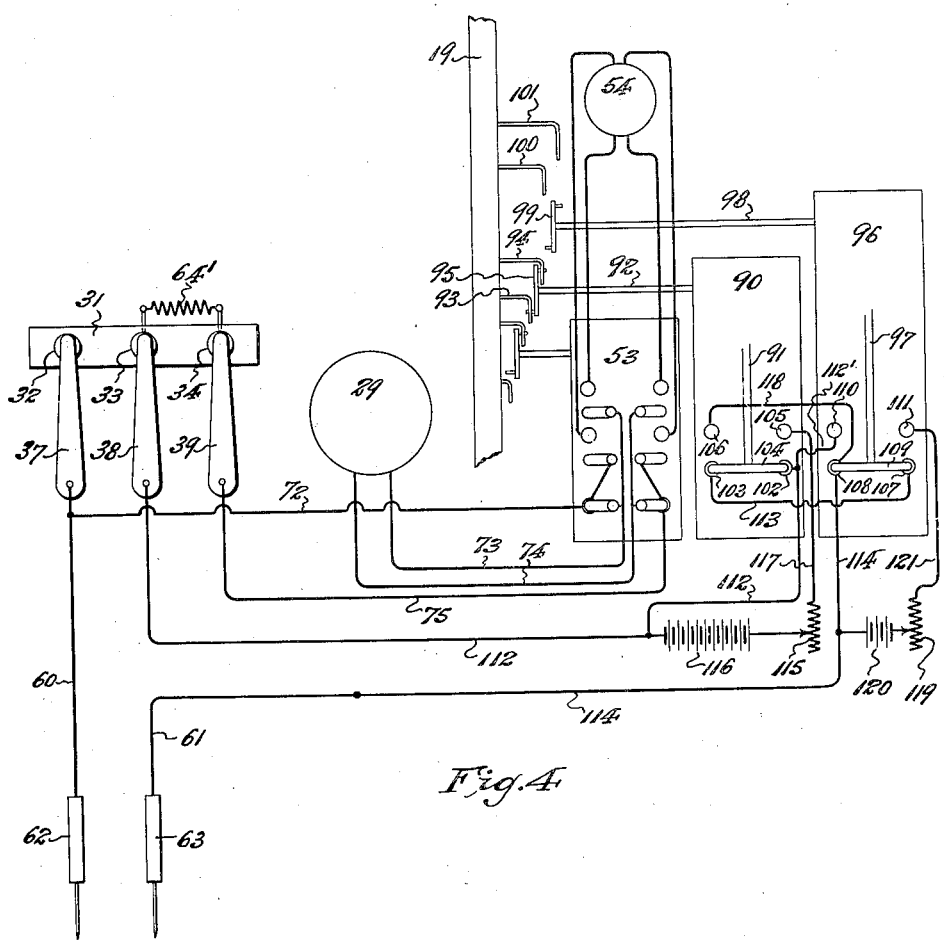

Fig. 3 is a schematic view and wiring diagram of an arrangement of the instrument suitable for selective use, with respect to either an A. C. or D. C. circuit to be tested, in measuring volts, amperes, microamperes or milliamperes; and Fig. 4 is another schematic view and wiring diagram of an arrangement of the instrument while, in addition to the aforesaid characteristics of a tested circuit, may be used for also measuring ohms and megohms.

Similiar characters of reference are employed in the above described views, to indicate corresponding parts.

An illustrative form of the meter according to this invention, as shown in Figs. 1 and 2, comprises a suitably shaped casing or housing 10. Journaled in and between the side walls of said casing or housing 10 are a plurality of parallel shafts which are arranged in suitably spaced relation. The number and spacing of said shafts is subject to wide variation, according to the length and disposition of an endless conveyer means adapted to be supported and operated thereby. As shown in Figs. 1 and 2 for the purposes of illustration, said shafts comprise an upper forward shaft 11, a lower forward shaft 12, a lower rearward shaft 13, an upper rearward shaft 14 and an intermediate shaft 15. Affixed to each shaft are a plurality of longitudinally spaced pin or sprocket wheels 16, 17 and 18, over which runs an endless conveyer means.

Said conveyer means comprises perforate endless belts 19, 20 and 21. The belt 19 is supported and its circuit defined by the pin or sprocket wheels 16; the belt 20 is supported and its circuit defined by the pin or sprocket wheels 17; while the belt 21 is supported and its circuit is defined by the pin or sprocket wheels 18. The perforations 22 of said belts are properly spaced so as to be operatively engaged by the radial pins 23 which project from the peripheries of said pin or sprocket wheels, whereby the motion of the wheels is transmitted to the belts, or the motion of the belts to said wheels as the case may be.

Suitably affixed to and between the conveyer belts 19 and 20, so as to run therewith, is an apron 24 upon the face of which are suitably imprinted appropriately graduated meter scales 25, respectively suited for the indication of the measurements of various characteristics subject to test by the meter. Said meter scales 25 are spaced longitudinally along said apron 24 at suitable intervals corresponding to the step by step movement to which, in operation, the conveyer means is subject.

The conveyer means provides a front course, extending between the upper forward shaft 11 and the lower forward shaft 12, which is spaced behind and parallel to the front wall 10' of the casing or housing 10. Provided in said front wall 10' of the casing or housing 10, and in position to oppose the line of travel of the apron 24 and its meter scales 25, is a viewing opening or window 26, with which said meter scales may be selectively brought in register for exposure and reading. Suitably supported within the casing or housing 10, as by the framing 27 of said viewing opening or window 26, is a bracket plate 28, and supported in turn by said bracket plate 28, or in any other suitable manner, is a D'Arsonval movement 29, the indicating needle 30 of which is disposed to cooperate with a selected meter scale which is registered with and visible through said viewing opening or window 26.

Suitably affixed to and so as to bridge between the conveyer belts 20 and 21, whereby to travel therewith, are a series of resistor coupler bars 31 which correspond in number and spacing to the number and spacing of said meter scales 25 on the apron 24, and which are respectively related to and so serve in connection with various testing circuit arrangements to be set up for use in connection with the respective meter scales as related to the D'Arsonval movement. Each resistor coupler bar is provided with spaced contact members 32, 33 and 34 which project from the faces thereof, and between selected pairs of which may be connected various suitably calibrated resistances and shunts or jumpers, hereinafter referred to, accordingly as it may, in any given case, be desired to connect a resistance in parallel or series relation to a given testing circuit set up to operate the D'Arsonval movement.

In order to support the conveyer means at the meter reading point where a selected meter scale and associated resistor coupler bar is positioned for use, and for other purposes about to be disclosed, an additional shaft 35 is journaled in and between the sides of the casing or housing 10 to extend adjacently across the back of the front course of said conveyer means, and fixed on said shaft 35 are pin or sprocket wheels 36 adapted to be respectively operatively engaged by the perforate belts 19, 20 and 21 of said conveyer means.

Arranged for cooperation with a resistor coupler bar which has been moved by the conveyer means to a position for use are a series of resilient contact arms or brushes 37, 38 and 39, which are respectively engageable with the contact members 32, 33 and 34 of said opposed resistor coupler bar. These contact arms or brushes are supported by a spring pressed carrier plate 40 which is hinged to an extension 41 of said bracket plate 28, or otherwise suitably mounted relative to the path of travel of the resistor coupler bar section of the conveyer means. Said carrier plate 40 is yieldably urged by its spring 42 in direction to engage the free ends of the contact arms or brushes 37, 38 and 39 respectively with the contact members 32, 33 and 34 of the operatively positioned resistor coupler bar.

Automatic means is provided for temporarily out swinging said contact arms or brushes while the conveyer means is in motion to bring a given resistor coupler bar into position for use, whereby to remove the free ends of the contact arms or brushes from the path of the approaching resistor coupler bar as it moves into place. The means for this purpose comprises a cam wheel 43 which is fixed on said shaft 35 so as to be rotated thereby when said shaft is driven by movement of the conveyer means belts over the pin or sprocket wheels 36. The periphery of said cam wheel 43 is provided with a series of indents or notches 44 spaced correspondingly to the step by step intervals by which the meter scales 25 and associated resistor coupler bars are spaced along the conveyer means. Affixed to said carrier plate 40 is a lever arm 45 having an angular extension 46 adapted to extend across the cam wheel periphery. Said extension 46 is preferably provided with an anti-friction roller 47 adapted to ride said cam wheel periphery. When a resistor coupler bar 31 is operatively positioned, an indent or notch 44 of the cam wheel 43 will be opposed to the lever arm extension 46 and its roller 47, so that the latter may drop thereinto, thus permitting the carrier plate 40 to be in swung by its spring 42, whereby to lower the contact arms or brushes into engagement with the contact members of the operatively positioned resistor coupler bar. When, however, the conveyer means is again moved so as to rotate the cam wheel 43, the roller 47 of the lever arm extension 46 will ride out of the engaged indent or notch 44 and onto the periphery of the cam wheel, along which it will ride until the next approaching notch 44 is registered therewith. Due to this, the lever arm 45, carrier plate 40 and contact arms or brushes 37, 38 and 39 will be out swung and held out swung while an approaching resistor coupler bar is moved into position, whereupon said next approaching notch 44 of the cam wheel will register with and receive said roller 47, thus again in swinging the lever arm, carrier plate and contact arms or brushes, whereby to operatively engage the latter with the contact members of said newly positioned resistor coupler bar.

The conveyer means may be manually moved at will in either direction to selectively position a meter scale and its associated resistor coupler bar for use. This may be done by utilizing any one or more of the conveyer means shafts as a drive shaft, and providing a finger piece or knob in connection with an exterior end thereof by means of which the same may be actuated. Illustrative of this, as shown in Fig. 1, both the upper forward shaft 11 and the lower forward shaft 12 have each been provided with an external manipulatable finger piece or knob 48.

Detent means is provided for yieldably holding the conveyer means both against shifting or displacement from an adjusted position adapted to selectively dispose a given meter scale and its associated resistor coupler bar for use, as well as to determine the proper position of the meter scale relative to and in register with the viewing opening or window 26 of the casing or housing 10 and relative to the D'Arsonval movement 29. For this purpose, one of the conveyer shafts, as e. g. the lower forward shaft 12, is provided with a detent wheel 49, which is affixed thereto intermediate one side of the conveyer means and the adjacent side wall of the casing or housing 10. The face of said detent wheel which is opposed to said casing or housing wall is provided with a series of indenting stop seats 50 spaced correspondingly to the step by step intervals by which the meter scales and associated resistor coupler bars are spaced along the conveyer means. Affixed to said casing or housing side wall is a tubular barrel 51 by which is supported a spring pressed check plunger or ball 52, which yieldably engages in an opposed stop seat 50 of the detent wheel 49 for the purposes above referred to.

Suitably mounted within the casing or housing 10 adjacent to the belt 19 of the conveyer means is a switch means 53 for cooperation with a rectifier 54, said switch means being operable to switch the rectifier into or out of a given testing circuit set up in connection with the D'Arsonval movement, accordingly as the circuit to be tested is of A. C. or D. C. character. Said switch may be of any suitable kind and construction, but an illustrative form thereof, as schematically shown more particularly in Fig. 3, comprises a movable switch member 55 adapted to be raised and lowered by an oscillatable crank-shaft 56 or the like relative to sets of fixed contact points engageable by contact blades carried by said movable switch member. The crank-shaft 56 is provided on an exterior end thereof with a rocking lever 57, disposed adjacent to the path of movement of the conveyer means belt 19. Carried by the conveyer means belt 19 are suitably shaped tripper devices adapted to project therefrom at appropriate points where service thereof is desired to actuate the rocking lever 57 to properly set the switch means 53 relative to various meter scales and associated resistor coupler bars which are allocated for testing of A. C. or D. C. circuits as the case may be. A pair of such tripper devices is shown in Fig. 3 comprising a tripper device 58 operative, by movement of the conveyer means in one direction, to engage and turn the rocking lever 57 and therefore the switch crank-shaft 56 in one direction (e. g. clockwise), whereby to lower the movable switch member 55 so as to set the switch to cut out the rectifier 54, and thus condition the D'Arsonval movement circuit for measurement of desired characteristics of a D. C. circuit to be tested; and another related tripper device 59 operative, by movement of the conveyer means in an opposite direction, to engage and turn the rocking lever 57 and therefore the switch crank-shaft 56 in the other direction (e. g. counter-clockwise), whereby to raise the movable switch member 55 so as to set the switch to cut in the rectifier 54, and thus condition the D'Arsonval movement circuit for measurement of desired characteristics of an A. C. circuit to be tested. The respective trip arms 58' and 59' of said tripper devices 58 and 59 are preferably made sufficiently flexible that, when a limit of motion of the rocking lever 57 is reached, or in reverse movement thereof relative to the latter, said trip arms will flex and spring or ride over the respective trip arm engageable pins 57' and 57" with which the rocking lever 57 is provided. It will be understood that pairs of switch controlling tripper devices 58—59 may be provided anywhere along the line of the conveyer means as needed and where the operation thereof is desired in connection with the various meter scales and associated resistor coupler bars accordingly as the latter are respectively assigned for measuring desired characteristics of an A. C. or a D. C. circuit to be tested.

Connected by their respective exteriorly extending flexible cables 60 and 61 with the testing meter, by which the same are included in the D'Arsonval movement circuit, as will be hereinafter more particularly set forth, are a pair of testing prods 62 and 63.

In the illustrative embodiment of the testing meter according to this invention, as shown in Fig. 3, the D'Arsonval movement circuits are arranged for measurement of volts, amperes, microamperes, and milliamperes optionally with respect to either an A. C. or a D. C. circuit to be tested. The resistor coupler bars associated with such meter scales 25 as are to be used for volt measurement are each provided with a resistance 64 suitably calibrated according to the particular range of voltages with reference to which a particular scale and bar is to be used. Each said resistance 64 is so arranged in connection with the resistor coupler bar by which it is carried as to be connected with the D'Arsonval movement in series with said movement, and to this end is connected between the contact members 33 and 34 of said bar, whereby to be included in the circuit wiring hereinafter described. On the other hand, the resistor coupler bars associated with such meter scales 25 as are to be used in measurement of amperes, microamperes and milliamperes are each provided with a resistance 65 also suitably calibrated according to the particular ranges thereof with reference to which a particular scale and bar is to be used. Each said resistance 65 is so arranged in connection with the resistor coupler bar by which it is carried as to be connected in the D'Arsonval movement circuit in parallel with the movement, and to this end is connected between the contact members 32 and 34 of said bar, whereby to be included in the circuit wiring hereinafter described. In this case a jumper connection 66 must be used between the contact members 33 and 34 of said bar.

For voltage measurement, a resistor coupler bar, having a suitably calibrated resistance 64, and its associated suitably graduated meter scale 25 is provided for measurement of each selected range of voltage desired to be subject to test. For example, a resistor coupler bar and associated meter scale may be provided and allocated for voltage testing in the following respective ranges, viz.:

For A. C. current:
    0 to 10; 0 to 25; 0 to 50; 0 to 100;
    0 to 200; 0 to 500; 0 to 1000;
    0 to 2000; etc.

For D. C. current:
    0 to 10; 0 to 25; 0 to 50; 0 to 100;
    0 to 200; 0 to 500; 0 to 1000;
    0 to 2000; etc.

For ampere measurement, a resistor coupler bar, having a suitably calibrated resistance 65, and its associated suitably graduated meter scale 25 is provided for measurement of each selected range desired to be subject to test. For example, a resistor coupler bar and associated meter scale may be provided and allocated for ampere testing in the following respective ranges, in respective groups for use in testing A. C. currents and D. C. currents as the case may be, viz.:

For amperes:
    0 to 1; 0 to 10; 0 to 25; 0 to 50; etc.
For microamperes:
    0 to 50; 0 to 100; 0 to 200;
    0 to 500; 0 to 1000; etc.
For milliamperes:
    0 to 1; 0 to 10; 0 to 25; 0 to 50;
    0 to 100; 0 to 200; 0 to 500;
    0 to 1000; etc.

Said respective groups of thus allocated resistor bars and associated meter scales are preferably arranged in desired sequence along the conveyer means; as e. g. a group for testing voltage ranges with respect to A. C. current, followed by a group for testing voltage ranges with respect to D. C. current; then a group for testing amperage ranges with respect to A. C. current, followed by a group for testing amperage ranges with respect to D. C. current, and so on. Intermediate groups respectively designed to test A. C. and D. C. currents, the conveyer means will be provided with the tripper devices 58 and 59, whereby to selectively and automatically set the switch means 53 preparatory to A. C. or D. C. current testing, as the case may be. The arrangement of said tripper devices 58 and 59 is such as to properly operate said switch means 53 regardless of the direction of movement of said conveyer means, whether forward or backward.

An identifying number for each resistor coupler bar and associated meter scale will be applied, in a suitable location relative thereto, to the apron 24 of the conveyer means (see Fig. 1). The casing or housing 10 and bracket plate 28 is provided with a viewing opening 67 through which may be visibly displayed the identifying number of selected resistor coupler bar and associated meter scale which, by movement of the conveyer means, has been brought into operative relation to the D'Arsonval movement and operatively introduced into the circuit thereof. Said identifying numbers will refer to an index table (not shown), having the various testing operations listed thereon and identified by corresponding numbers; which index table may be separate from the testing meter, but would preferably be affixed to and exposed on the exterior of the casing or housing 10 for convenient and ready reference thereto. By such arrangement, the testing meter may be quickly and easily set for use in making any given selected test, by moving the conveyer means until the number of such test setting is visibly displayed. For example, assume that it is desired to test the amperage of a D. C. circuit in the range of 0 to 10 amperes, the resister coupler bar and meter scale for which test is identified by the numeral "2"; in such case, the conveyer means may be moved in either direction until said identifying number "2" appears through the viewing opening 67, the appearance of which will indicate that the proper resistor coupler bar and associated meter scale has been brought into operative relation to the D'Arsonval movement ready for the making of such test.

The switch means 53 is provided with lower fixed contacts 68 and 69 respectively engageable by contact blades 70 and 71 carried by the movable switch member 55. The contact arm or brush 37 is connected with the lower fixed contact 68 by a conductor 72. The switch contact blade 70, which is cooperative with said lower fixed contact 68, is connected to one pole of the D'Arsonval movement by a conductor 73. The other pole of said D'Arsonval movement is connected with the switch contact blade 71, which is cooperative with the other lower fixed contact 69, by a conductor 74, and said lower fixed contact 69 is connected to the arm or brush 39 by a conductor 75. The test prod 62 is tapped or joined by its cable 60 to the conductor 72, and the test prod 63 is connected by its cable 61 to the contact arm or brush 38.

The switch means 53 is further provided with a pair of vertically spaced upper fixed contacts 76 and 77 respectively engageable by contact blades 78 and 79 carried by the movable switch member 55, and with a second pair of similar vertically spaced upper fixed contacts 80 and 81 respectively engageable by contact blades 82 and 83 also carried by the movable switch member 55. The contact blade 78 is connected by conductive means to the conductor 72, as by a jumper 84 connected between the lower fixed contact 68 and said contact blade 78.

The input side of the rectifier 54 is connected between the upper fixed contacts 76 and 80 by the respective conductors 85 and 86. The contact blade 82 is connected by conductive means to the conductor 75, as by a jumper 87. The output side of the rectifier 54 is connected between the upper fixed contacts 77 and 81 by the respective conductors 88 and 89. The contact blade 79, which cooperates with the upper fixed contact 77 is connected by the extension conductor 73' to the conductor 73 which leads to the D'Arsonval movement, while the conductor 74 which leads from said D'Arsonval movement is connected through the extension conductor 74' to the contact blade 83 which cooperates with said upper fixed contact 81.

To illustrate the operation of the testing meter of this invention, assume that the setting is arranged (as shown in Fig. 3) to test the amperage of a D. C. circuit in the range of 0 to 10 amperes, on making such setting, prior to the operative positioning of the selected resistor coupler bar 31 and associated meter scale 25, a tripper device 58 will have set the switch means 53 for D. C. current response of the D'Arsonval movement 29, by lowering the movable switch member 55 to carry the contact blades 70 and 71 thereof respectively into circuit closing engagement with the respective fixed contacts 68 and 69 of said switch means, while at the same time disengaging the contact blades 78, 79, 82 and 83 respectively from the upper fixed contacts 76, 77, 80 and 81, thus cutting out the rectifier 54. When, after such setting, the test prods 62—63 are applied to the circuit to be subjected to test, current will pass through test prod 62 and its cable 60, conductor 72, contact 68 and engaging contact blade 70, and conductor 73 to the D'Arsonval movement 29, and thence by conductor 74, contact blade 71 and engaged contact 69, conductor 75, contact arm or brush 39, jumper 66, and contact arm or brush 38, to test prod cable 61 and test prod 63; while at the same time the resistance 65 will be connected in parallel with the D'Arsonval movement circuit thus established through conductor 72, contact arm or brush 37 and contact arm or brush 39, between which contact arms or brushes the resistance 65 is connected. The testing circuit being thus established, the D'Arsonval movement will be energized, and its needle 30 moved relative to the meter scale referred thereto, whereby to indicate on the latter the amperage of the circuit subjected to test.

If the meter is set for determining the voltage of a D. C. circuit desired to be subjected to test, a resistor coupler bar carrying a resistance 64 and an associated meter scale is brought into circuit with the D'Arsonval movement. In such case, the test prods 62—63 when applied to the circuit to be subjected to test will cause current to pass through test prod 62 and its cable 60, conductor 72, contact 68 and engaging contact blade 70 and conductor 73 to the D'Arsonval movement, and thence by conductor 74, contact blade 71 and engaged contact 69, conductor 75, contact arm or brush 39, through resistance 64, and thence by contact arm or brush 38 to test prod cable 61 and test prod 63. In such circuit arrangement, said resistance 64 is connected in series with the D'Arsonval movement.

As thus far described, the meter of this invention provides a comparatively simple form thereof adapted more particularly for voltage and amperage measurements; if desired, however, the meter may be modified to include means adapted to condition the same so as to additionally function as an ohmmeter. This is schematically shown in Fig. 4 of the drawings; and is accomplished by incorporating additional control switch means, one for conditioning the meter for ohm measurement in low range, and another for conditioning the meter for ohm measurement in high range. To this end, one switch means 90 is provided, the same having a movable switch member 91 adapted to be moved by its crankshaft 92. Said crank-shaft 92 is adapted to be actuated by tripper devices 93 and 94 carried by the belt 19 of the conveyer means, said tripper devices cooperating with the crank-shaft rocking lever 95, substantially in the manner already described in connection with the A. C.-D. C. switch means 53. Another switch means 96 is provided, the same also having a movable switch member 97 adapted to be moved by its crankshaft 98 as similarly actuated through the shaft rocking lever 99 by tripper devices 100 and 101 also carried by the conveyer means belt 19. Said switch means 90 is provided with a pair of lower fixed contacts 102 and 103 adapted, when the movable switch member 91 is in down position, to be bridged by the switch contact blade 104 of the latter; and a pair of upper fixed contacts 105 and 106 adapted, when the movable switch member is in up position, to be bridged by said switch blade 104. Similarly, the switch means 96 is provided with a pair of lower fixed contacts 107 and 108 adapted, when the movable switch member 97 is in down position, to be bridged by the switch blade 109 of the latter; and a pair of upper fixed contacts 110 and 111 adapted, when the movable switch member 97 is in up position, to be bridged by said switch blade 109.

When said switch means 90 and 96 are employed, the circuit wiring between the test prods 62 and 63 is somewhat modified, whereby to include said switch means 90 and 96 in association with the switch means 53 and D'Arsonval movement. To this end, instead of connecting the contact arm or bush 38 directly with the cable 61 of the test prod 63, a conductor 112 is led from said contact arm or brush 38 to the lower fixed contact 102 of the switch means 90; a conductor 113 is led from lower fixed contact 103 of the switch means 90 to lower fixed contact 107 of switch means 96; and a conductor 114 is led from the lower fixed contact 108 of switch means 96, to which the cable 61 of test prod 63 forms an extension.

When ohmmeter functioning of the meter is not desired, the switch blades 104 and 109 of the respective switch means 90 and 96 are disposed in down positions as shown in Fig. 4, whereby the meter is conditioned to function merely for voltage or amperage measurements in the manner above described. In such case, the circuit through the switch means 53 and D'Arsonval movement 29 is completed through the conductor 112, bridged contacts 102—103, conductor 113, and bridged contacts 107 and 108, thus cutting out the respective potentiometer means which are respectively connected with the respective switch means 90 and 96, in the manner hereinafter set forth.

The switch means 90, when operated to raise its movable switch member 91, whereby to bridge the upper fixed contacts 105 and 106 by the contact blade 104, brings into the D'Arsonval movement circuit a potentiometer means suitable for use in high range ohm measurement. Said potentiometer means comprises a variable resistance of relatively high value in series with a battery 116 of relatively high voltage. The positive pole of the battery 116 is connected with the conductor 112, and its negative pole with the variable resistance 115. The coil of the variable resistance 115 is connected by a conductor 117 with the upper fixed contact 105 of switch means 90. The upper fixed contact 106 of said switch means 90 is connected by a conductor 118 with the lower fixed contact 108 of switch means 96, and thence to conductor 114 and cable 61 of test prod 63.

The switch means 96, when operated to raise its movable switch member 97, whereby to bridge the upper fixed contacts 110 and 111 by the contact blade 109, brings into the D'Arsonval movement circuit a potentiometer means suitable for use in low range ohm measurement. This potentiometer means comprises a variable resistance 119 of relatively low value in series with a battery 120 of relatively low voltage. To the upper fixed contact 110 of said switch means 96 is connected an extension 112' of the conductor 112. The upper fixed contact 111 of said switch means 96 is connected by a conductor 121 to the coil of said variable resistance 119. The positive pole of the battery 120 is connected with the variable resistance, and its negative pole with the conductor 114 and cable 61 of test prod 63.

The potentiometer means may be regulated through their variable resistances, whereby to bring the needle of the D'Arsonval movement to zero ohms position, when the test prods 62 and 63 are shorted, and preparatory to an ohm measurement with respect to a circuit desired to be tested.

When using the meter of this invention for ohm measurement, the A. C.-D. C. switch means 53 is set with its movable switch member in the down or rectifier cut out position.

Assuming it is desired to make ohm measurements in low range, e. g. 0 to 1 ohm or 1 ohm to 1 megohm, selectively usable resistor coupler bars are respectively provided with resistances 64' suitably calibrated to a proper value to correspond with the range of suitably graduated meter scales respectively associated therewith, as e. g. to operate in respective steps 0 to 1 ohm; 0 to 500 ohms; 0 to 1000 ohms; 0 to 10,000 ohms; 0 to 100,000 ohms; 0 to 500,000 ohms, and 0 to 1,000,000 ohms or 1 megohm. When making ohm measurements in such low range steps, the switch means 90 is left in open relation to its potentiometer circuit, but switch means 96 is moved to closed relation to its potentiometer circuit. Under these circumstances, current from the external circuit subject to test passes from test prod 62 to cable 60 and conductor 72 through switch means 53 and D'Arsonval movement 29, thence by conductor 75, contact arm or brush 39, resistance 64', contact arm or brush 38 to conductors 112—112', thence across upper fixed contacts 110 and 111 as bridged by contact blade 109, thence to potentiometer resistance and battery 119—120, by way of conductors 121, and thence by conductor 114 and cable 61 to test prod 63; thereby energizing the D'Arsonval movement to indicate the ohm value of the external circuit tested on the cooperating meter scale.

When using the meter of this invention for ohm measurements in high range, e. g. 0 to 10 megohms; 0 to 20 megohms; 0 to 30 megohms; etc., properly calibrated resistances 64' are similarly brought into the testing circuit by their resistor coupler bars, and at the same time suitably graduated meter scales are brought into cooperative relation to the D'Arsonval movement. When making an ohm measurement in such high range steps, the switch means 96 is set in open relation to its potentiometer circuit, but the switch means 90 is moved to closed relation to its potentiometer circuit. Under these circumstances, current from the external circuit subject to test passes from test prod 62 to cable 60 and conductor 72 through switch means 63 and D'Arsonval movement 29, thence by conductor 75, contact arm or brush 39, resistance 64', contact arm or brush 38 to conductor 112 and the potentiometer battery and resistance 116—115, thence through conductor 117 and across upper fixed contacts 105 and 106 as bridged by contact blade 104 to conductors 118 and 114 and cable 61 to test prod 63; thereby energizing the D'Arsonval movement to indicate the megohm value of the external circuit tested on the cooperating meter scale.

While I have described my multi-purpose meter as arranged for testing external circuits as to voltage, amperage and ohm values, it will be obvious that modified arrangements thereof may be provided to adapt the same for measurements of other or additional electrical characteristics.

It will be understood that many changes could be made in the multi-purpose meter of this invention without departing from the scope of this invention as defined by the following claims. It is therefore intended that all matter shown in the accompanying drawings and described in the foregoing specification shall be considered as illustrative and not in a limiting sense.

I claim:

1. In apparatus provided with a measuring instrument for the purpose described, a housing, a plurality of suitably spaced sprocket equipped shafts journaled in and across said housing, means for manipulating one of said shafts as a driving shaft, an endless belt supported and driven by the sprockets of said shafts, said belt having resistor coupler bars and corresponding meter scales spaced therealong adapted to be selectively brought into cooperative relation to the measuring instrument by manipulated movement of the belt, said resistor coupler bars having switch contacts, a spring pressed carrier plate pivotally supported in connection with the housing and having contact brushes adapted to engage said switch contacts, whereby to connect a selected resistor coupler bar relative to the measuring instrument in testing circuit relation, a peripherally notched cam wheel operated by one of said shafts, and said carrier plate having an arm cooperative with said notched cam wheel, whereby rotation of the latter automatically displaces said arm from a notch thereof so as to outswing the carrier plate to hold its contact brushes out of the path of said resistor coupler bars as the latter are shifted by belt movement to and from cooperative relation to the measuring instrument.

2. In apparatus of the kind described as defined in claim 1, a rectifier, rectifier control switch means, means adjacent a course of the belt for operating said control switch means, and trip devices carried by the belt for actuating said switch operating means.

3. In apparatus of the kind described as defined in claim 1, a detent wheel mounted on one of said shafts, and a yieldable stop cooperative with said detent wheel whereby to hold the belt against accidental shifting displacement from an adjusted position adapted to dispose a selected resistor coupler bar and its associated meter scale for use.

4. In apparatus of the kind described as defined in claim 1, a detent wheel mounted on one of said shafts, a yieldable stop cooperative with said detent wheel whereby to hold the belt against accidental shifting displacement from an adjusted position adapted to dispose a selected resistor coupler bar and its associated meter scale for use, a rectifier, rectifier control switch means, means adjacent a course of the belt for operating said control switch means, and trip devices carried by the belt for actuating said switch operating means.

5. In apparatus of the kind described as defined in claim 1, a rectifier, rectifier control switch means, means adjacent a course of the belt for operating said rectifier control switch means, trip devices carried to said belt for actuating said rectifier control switch operating means, a potentiometer, potentiometer control switch means, means also adjacent a course of the belt for operating said potentiometer control switch means, and additional trip devices carried by said belt for actuating said potentiometer control switch operating means.

ADAM SADLON.

REFERENCES CITED

The following references are of record in the file of this patent:

UNITED STATES PATENTS

| Number | Name | Date |
|---|---|---|
| 1,811,319 | Johnson | June 23, 1931 |
| 1,959,592 | Macadie | May 22, 1934 |
| 2,101,296 | Simpson et al. | Dec. 7, 1937 |

FOREIGN PATENTS

| Number | Country | Date |
|---|---|---|
| 409,784 | Great Britain | May 10, 1934 |